(12) United States Patent
Kawai et al.

(10) Patent No.: US 6,960,151 B2
(45) Date of Patent: Nov. 1, 2005

(54) TOROIDAL CONTINUOUSLY VARIABLE TRANSMISSION

(75) Inventors: Norikazu Kawai, Wako (JP); Kazuo Ooyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 102 days.

(21) Appl. No.: 10/283,045

(22) Filed: Oct. 30, 2002

(65) Prior Publication Data

US 2003/0100400 A1 May 29, 2003

(30) Foreign Application Priority Data

Nov. 26, 2001 (JP) .............................. 2001-359890

(51) Int. Cl.⁷ ............................................. F16H 15/38
(52) U.S. Cl. ......................................... 476/40; 476/42
(58) Field of Search .............................. 476/40, 42, 46; 403/292, 354, 381

(56) References Cited

U.S. PATENT DOCUMENTS

| | | | |
|---|---|---|---|
| 2,112,763 A | * | 3/1938 | Cloudsley .................... 476/41 |
| 4,885,949 A | * | 12/1989 | Barber, Jr. .................... 476/10 |
| 5,022,645 A | * | 6/1991 | Green ......................... 271/276 |
| 5,584,778 A | * | 12/1996 | Machida et al. .............. 476/46 |
| 5,599,252 A | * | 2/1997 | Fukushima ................... 476/40 |
| 5,779,591 A | * | 7/1998 | Inoue .......................... 476/42 |
| 6,375,595 B1 | * | 4/2002 | Machida et al. .............. 476/42 |
| 6,568,297 B2 | * | 5/2003 | Ooyama ................... 74/665 R |
| 2002/0028723 A1 | * | 3/2002 | Hirano et al. ................. 476/42 |

FOREIGN PATENT DOCUMENTS

JP          2000-257685      9/2000

* cited by examiner

*Primary Examiner*—William C. Joyce
(74) *Attorney, Agent, or Firm*—Westerman, Hattori, Daniels & Adrian, LLP

(57) ABSTRACT

The toroidal continuously variable transmission comprises a drive shaft which is rotationally driven by an engine, an input shaft which is disposed adjacent to and coaxially with this drive shaft, input disk which rotate integrally with the input shaft, output disks which are disposed coaxially with the input disks so as to be capable of rotating relatively thereto and to face the input disks, trunnion assemblies which are clamped between the input disks and the output disks so that these trunnion assemblies are free to swing, a pushing cylinder which pushes the input disks and output disks in the respective directions that cause these disks to clamp the trunnion assemblies, and a coupling mechanism which connects the drive shaft and the input shaft by means of an Oldham coupling.

7 Claims, 9 Drawing Sheets

TOROIDAL CONTINUOUSLY VARIABLE TRANSMISSION

FIELD OF THE INVENTION

The present invention relates to a toroidal continuously variable transmission which is constructed by clamping a trunnion assembly between input and output disks that are disposed facing each other.

BACKGROUND OF THE INVENTION

Toroidal continuously variable transmissions are already generally known, as is disclosed for example in Japanese Patent Application Laid-Open No. 2000-257685. A toroidal continuously variable transmission is constructed from an input disk that is rotationally driven by an engine or the like, an output disk that is disposed facing this input disk so that relative rotation is possible, a trunnion assembly which is clamped between the input and output disks, and which performs a swinging motion, and a pushing mechanism (loading mechanism) which pushes the input disk and output disk in the directions that clamp the trunnion assembly. Such a transmission is constructed so that the speed reduction ratio between the input and output disks can be controlled in a continuously variable manner by swinging the trunnion assembly. In this case, the pushing mechanism is constructed so that (for example) the input disk is pushed toward the output disk by hydraulic pressure, and this pushing force is set in accordance with the input torque or the like. As a result, the clamping force of the trunnion assembly between the input and output disks is appropriately set in accordance with the input torque, and slipping between the input and output disks and the trunnion assembly is prevented so that power transmission is accomplished with high efficiency.

Since the apparatus is thus constructed so that the input and output disks clamping the trunnion assembly are pushed in the axial direction by a pushing mechanism, the input and output disks are moved in the axial direction while undergoing elastic deformation in accordance with the pushing force. In order to allow such movement in the axial direction, the drive shaft that is driven by the engine and the input shaft to which the input disk is attached are constructed as separate parts, and a rotary connecting mechanism is provided which transmits rotation while allowing movement of the input shaft in the axial direction relative to the drive shaft. For example, such a rotating connecting structure may have a construction in which disk-form parts that face each other are respectively disposed on the drive shaft and the input shaft, first and second engaging parts are constructed by forming a plurality of teeth that protrude toward each other in the axial direction on the outer circumferences of these disk-form parts, and engaging the teeth of these first and second engaging parts, as disclosed in the abovementioned patent.

However, in cases where the drive shaft and input shaft are constructed as separate parts as described above, the following problem arises: specifically, if any axial deviation occurs in the shafts, or if biased load acts on the shafts, a biased load will be applied to the tooth surfaces of the engaging parts, so that relative movement between the two shafts in the axial direction is impeded, and so that the tooth surfaces are damage. One conceivable method of alleviating this problem of axial deviation and biased loads is to increase the precision of the parts; however, this leads to the problem of increased manufacturing costs. Furthermore, axial deviation and biased loads can also be suppressed by increasing the installation span of the bearings that support the shafts so that the shafts are free to rotate; however, this leads to the problem of an increase in the axial dimension of the apparatus and an increase in the size of the transmission.

SUMMARY OF THE INVENTION

The present invention was devised in light of such problems; it is an object of the present invention to provide a toroidal continuously variable transmission which is devised so that smooth relative movement and transmission of rotation can be accomplished without generating any biased load, while allowing relative movement in the axial direction, and also allowing axial deviation, between the drive shaft and the input shaft.

The toroidal continuously variable transmission of the present invention is constructed so that this transmission comprises a drive shaft which is rotationally driven by a driving source, an input shaft which is disposed adjacent to and coaxially with this drive shaft, an input disk which rotates integrally with the input shaft, an output disk which is disposed coaxially with the input disk so that relative rotation is possible and so that the output disk faces the input disk, a trunnion assembly which is clamped between the input disk and the output disk so that this trunnion assembly is free to swing, a pushing mechanism (e. g., a mechanism consisting of the pushing cylinder 215 in the embodiment) which pushes the input disk and output disk in the [respective] directions that [cause these disks to] clamp the trunnion assembly, and a rotary connecting mechanism (e. g., a coupling mechanism CP in the embodiment) which connects the drive shaft and the input shaft by means of an Oldham coupling.

Since the rotary connecting mechanism is thus constructed using an Oldham coupling, the smooth transmission of rotation between the two shafts can be accomplished between the drive shaft and the input shaft while allowing relative movement in the axial direction and axial deviation of the two shafts; furthermore, a biased load is also prevented from acting on the coupling part.

Furthermore, it is desirable that a bearing (e. g., the automatic-centering ball bearing 28 in the embodiment) be provided which supports the drive shaft on the housing so that the drive shaft is free to rotate, and that an inner circumferential side recessed part be formed in the central portion of the drive shaft so that this recessed part opens on the side of the input shaft; furthermore, it is desirable that the tip end portion of the input shaft on the side of the drive shaft be formed so that this tip end portion is inserted into the inner circumferential side recessed part, that a supporting member (e. g., the roller bearing 26 in the embodiment) be provided which is disposed between this tip end portion and the inner circumferential side recessed part, and which supports the tip end portion of the input shaft on the drive shaft, and that the bearing and supporting member be disposed in substantially the same position in the axial direction so that these parts overlap in the diametrical direction.

If such a construction is used, then no biased load is applied to the connecting parts, since the drive shaft and input shaft are connected using an Oldham coupling as described above. In this case, the load that acts on the input shaft is received by the supporting member at the tip end portion of the input shaft that is inserted into the inner circumferential side recessed part of the drive shaft; here, the supporting member is disposed in the same position as the bearing in the axial direction, so that these parts overlap in the diametrical direction, allowing the load on the tip end portion of the input shaft to be received by the housing from the drive shaft via the bearing, and thus preventing any biased load from acting on the bearing that supports the drive shaft so that the drive shaft is free to rotate. Accordingly, the rotational support of the drive shaft by the bearing is stable.

In the case described above, it is desirable that the Oldham coupling that constitutes the abovementioned rotary connecting mechanism be constructed from a pair of first connecting projections which are separated by 180 degrees about the rotational axis and caused to protrude in the axial direction on the end surface of the drive shaft, and which are formed with a rectangular shape that extends in the diametrical direction, a pair of second connecting projections which are separated by 180 degrees about the rotational axis and caused to protrude in the axial direction on the end surface of the input shaft that faces the end surface of the drive shaft, and which are formed with a rectangular shape that extends in the diametrical direction, and a connecting member (e. g., the connecting plate 15 in the embodiment) which is disposed between the end surface of the drive shaft and the end surface of the input shaft, and in which a pair of first connecting holes that accommodate the first connecting projections so that these projections are free to slide in the diametrical direction and constrained in the circumferential direction, and a pair of second connecting holes that accommodate the second connecting projections so that these projections are free to slide in the diametrical direction and constrained in the circumferential direction, are formed, and that the first connecting holes and second connecting holes be formed in positions that are separated by 90 degrees about the rotational axis.

If an Oldham coupling constructed as described above is used, then, since the sliding movement of the first connecting projections in the diametrical direction that is allowed by the engagement [of these first connecting projections] with the first connecting holes and the sliding movement of the second connecting projections in the diametrical direction that is allowed by the engagement [of these second connecting projections] with the second connecting holes are separated by a rotational angle of 90 degrees, axial deviation in any direction can be absorbed by these two sliding movements in the diametrical direction, so that the smooth transmission of rotation between the two shafts is possible. Furthermore, since the first and second connecting projections and first and second connecting holes are disposed on the outside in the diametrical direction, the contact surface pressure between the first and second connecting projections and the first and second connecting holes can be kept to a small value even in cases where a large torque is transmitted, so that a large torque can be smoothly transmitted without any impediment.

The abovementioned toroidal continuously variable transmission may also be equipped with a wound power transmitting mechanism (e. g., the belt mechanism BM in the embodiment) that transmits the rotation of the drive shaft to the countershaft, and a power transmitting mechanism that congregates the rotation of the output disk and rotation of the countershaft, and transmits this rotation to the output side (i. e., the transmission may be constructed as a torque-splitting type toroidal continuously variable transmission as shown in the embodiment). In this case, it is desirable that the bearing that supports the drive shaft on the housing so that the drive shaft is free to rotate (e. g., the automatic-centering ball bearing 28 in the embodiment) be disposed in substantially the same position in the axial direction as the driving rotating member (e. g., the driving sprocket 61 in the embodiment) that forms a part of the wound power transmitting mechanism that is disposed on the outer circumference of the drive shaft, so that these parts overlap in the diametrical direction. As a result, the diametrical load that acts on the drive shaft during the transmission of the power by the wound power transmitting mechanism can be caused to act directly on the bearing, so that no biased load acts on the bearing, and the rotational support of the drive shaft by the bearing is stable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
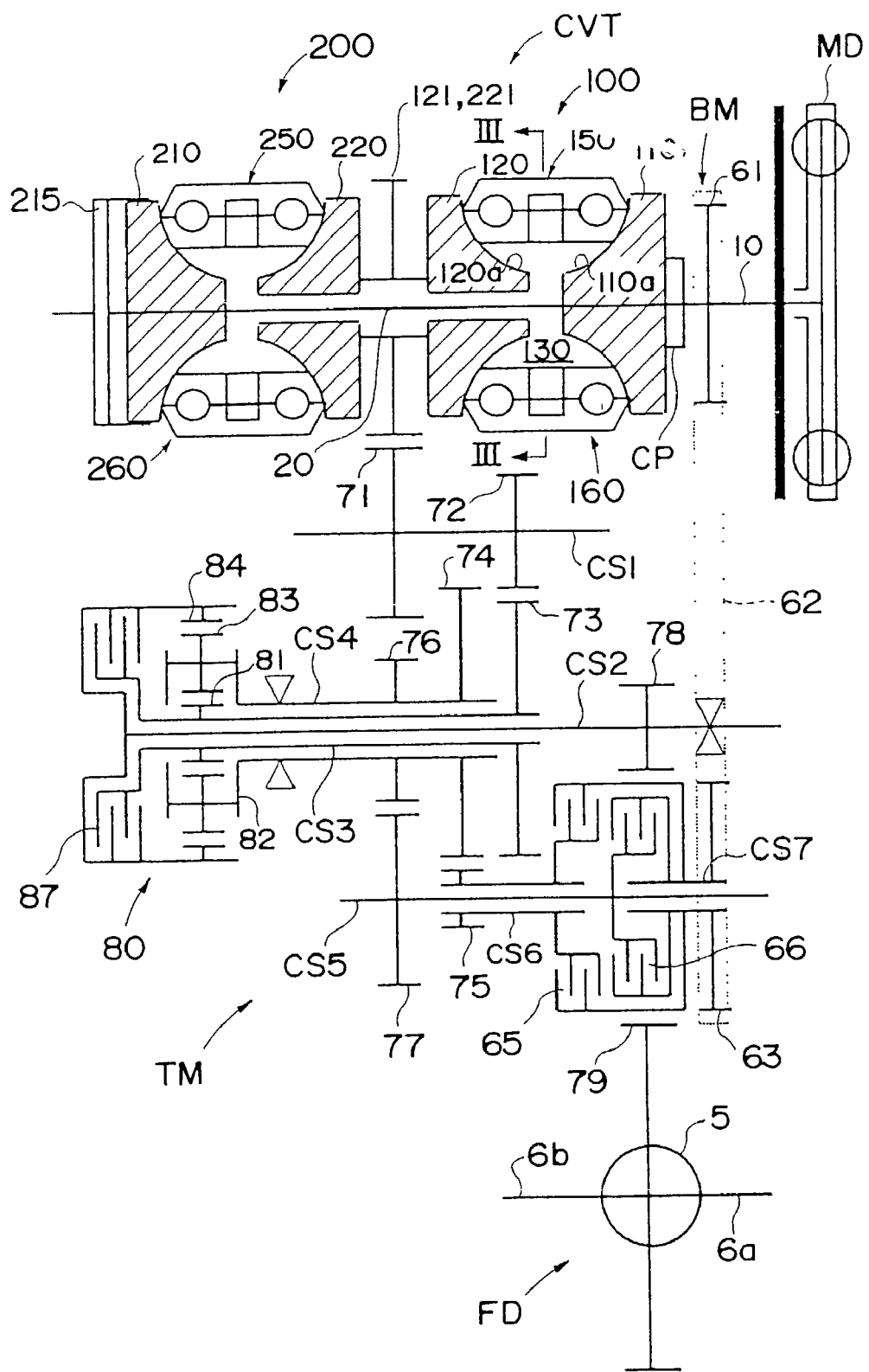
FIG. 1 is a schematic diagram which shows the construction of the power transmission path of the toroidal continuously variable transmission of the present invention.

A preferred embodiment of the present invention will be described below with reference to the attached figures. The construction of the power transmission path of the torque-splitting type toroidal continuously variable transmission of the present invention is shown in FIG. 1. This continuously variable transmission is equipped with a drive shaft 10 that is connected via a mass damper MD to the output shaft of an engine (not shown in the figures) used as a driving source. The rotational driving force of the engine that is transmitted to the drive shaft 10 is transmitted to the output side (e. g., driving wheels) after being caused to undergo a speed change. The drive shaft 10 is connected to the toroidal continuously variable transmission mechanism CVT via a coupling mechanism (rotary connecting mechanism) CP, and is connected to a power transmitting mechanism TM via a belt mechanism BM. Furthermore, the output gear of the toroidal continuously variable transmission mechanism CVT is connected to the power transmitting mechanism TM, and the output rotational driving force of the toroidal continuously variable transmission mechanism CVT and the rotational driving force transmitted by the belt mechanism BM are congregated by the power transmitting mechanism TM and transmitted to a final speed-reduction gear FD. [The congregated rotational driving force] is then transmitted to the left and right driving wheels (not shown in the figures) from the final speed-reduction gear FD.

First, the toroidal continuously variable transmission mechanism CVT will be described. As is shown in detail in FIG. 2, this toroidal continuously variable transmission mechanism CVT has a transmission input shaft 20 which is connected to the drive shaft 10 via a coupling mechanism CP. First and second toroidal transmission units 100 and 200 are disposed side by side on this transmission input shaft 20. Furthermore, since the first and second toroidal transmission units 100 and 200 have the same construction, corresponding constituent members are indicated by symbols in which the last two digits are the same.

The first toroidal transmission unit 100 is constructed from a first input disk 110 which has a half-doughnut-shaped inside surface 110*a* that is semicircular in cross section, a first output disk 120 which has a half-doughnut-shaped inside surface 120*a* that faces this inside surface 110*a* in the axial direction, and that is semicircular in cross section, and a pair of first and second trunnion assemblies 150 and 160 which are disposed inside a first cavity 130 surrounded by the inside surfaces 110*a* and 120*a* of the first input and first output disks 110 and 120, and which are clamped in a state in which these trunnion assemblies contact the abovementioned inside surfaces 110*a* and 120*a*. Furthermore, these trunnion assemblies 150 and 160 are disposed in positions that face each other across the rotational axis of the two disks 110 and 120, i. e., in positions that are symmetrical on either side of the rotational axis.

The first input disk 110 and first output disk 120 are disposed on the transmission input shaft 20 so that these disks face each other in positions that are coaxial with the transmission input shaft 20, and the first input disk 110 is spline-connected with the transmission input shaft 20 so that this first input disk 110 rotates integrally with the transmission input shaft 20. Meanwhile, the first output disk 120 is disposed on the transmission input shaft 20 so that this first output disk 120 is free to rotate relative to the transmission input shaft 20, and a first output disk gear 121 is formed on the outer circumference of the first output disk 120.

The second toroidal transmission unit 200 is constructed so that this unit shows left-right symmetry in the axial direction with respect to the first toroidal transmission unit 100; this second toroidal transmission unit 200 is constructed from a second input disk 210 which has a half-doughnut-shaped inside surface 210*a*, a second output disk 220 which has a half-doughnut-shaped inside surface 220*a* that faces the abovementioned inside surface 210*a* in the axial direction, and a pair of third and fourth trunnion assemblies 250 and 260 which are clamped inside a second cavity 230 surrounded by the abovementioned inside surfaces 210*a* and 220*a*. Both disks 210 and 220 are disposed on the input shaft 1 so that these disks face each other in positions that are coaxial with the input shaft, and the second input disk 210 is coupled to the transmission input shaft 20 so that this second input disk 210 rotates integrally with the transmission input shaft. Meanwhile, the second output disk 220 is disposed on the transmission input shaft 20 so that this second output disk 220 is free to rotate relative to the transmission input shaft 20; furthermore, [the second output disk 220] is connected to the first output disk 120, and rotates integrally with the first output disk 120. Moreover, a second output disk gear 221 which has the same number of teeth as the first output disk gear 121 is constructed from a double-helical gear on the outer circumference of the second output disk 220.

A pushing cylinder 215 is attached to the end portion of the transmission input shaft 20 located on the opposite end from the input end (i. e., the left end in FIG. 2), and the second input disk 210 is inserted into this pushing cylinder 215 so that the second input disk 210 is free to slide in the axial direction. Specifically, the left end portion of the second input disk 210 functions as a pushing piston, and causes a loading hydraulic pressure to act inside the pushing cylinder 215 via an oil passage hole inside the transmission input shaft 20, so that the second input disk 210 is pushed to the right (toward the second output disk 220). Here, as is shown in detail in FIG. 2, a disk-form flange part 21 is formed on the right end of the transmission input shaft 20, and the first input disk 110 is received by the flange part 21 so that the movement [of the first input disk 110] to the right is restricted. Meanwhile, the second input disk 210 and first and second output disks 120 and 220 are respectively attached to the transmission input shaft 20 so that these disks can move in the axial direction. Accordingly, when the second input disk 210 is pushed in the rightward direction as a result of receiving the loading hydraulic pressure inside the pushing cylinder 215 as described above, the first and second trunnion assemblies 150 and 160 are clamped between the first input and output disks 110 and 120, and the third and fourth trunnion assemblies 250 and 260 are clamped between the second input and output disks 210 and 220.

Figure 2:
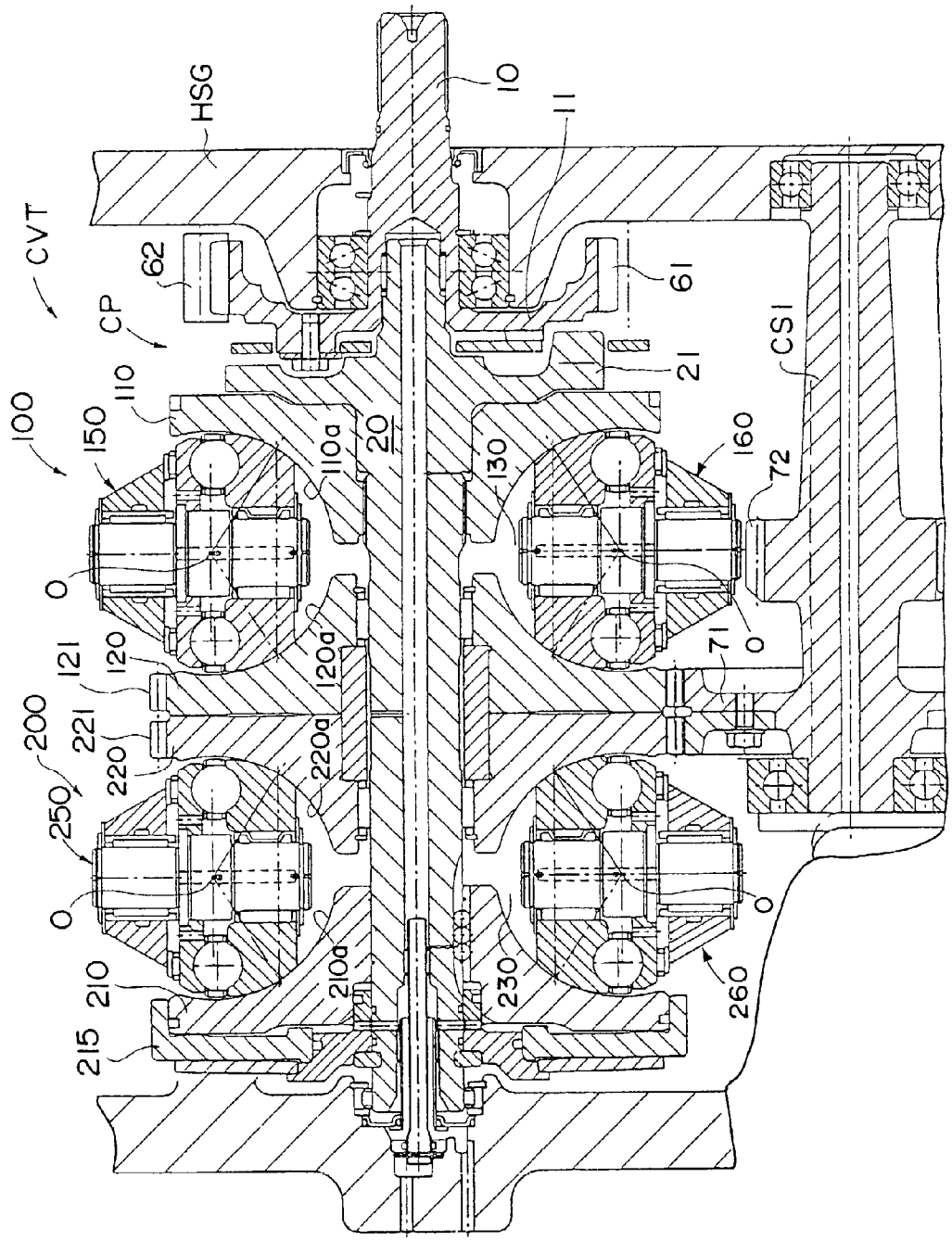
FIG. 2 is a sectional view which the construction of the toroidal continuously variable transmission that constitutes the abovementioned transmission.
Figure 3:
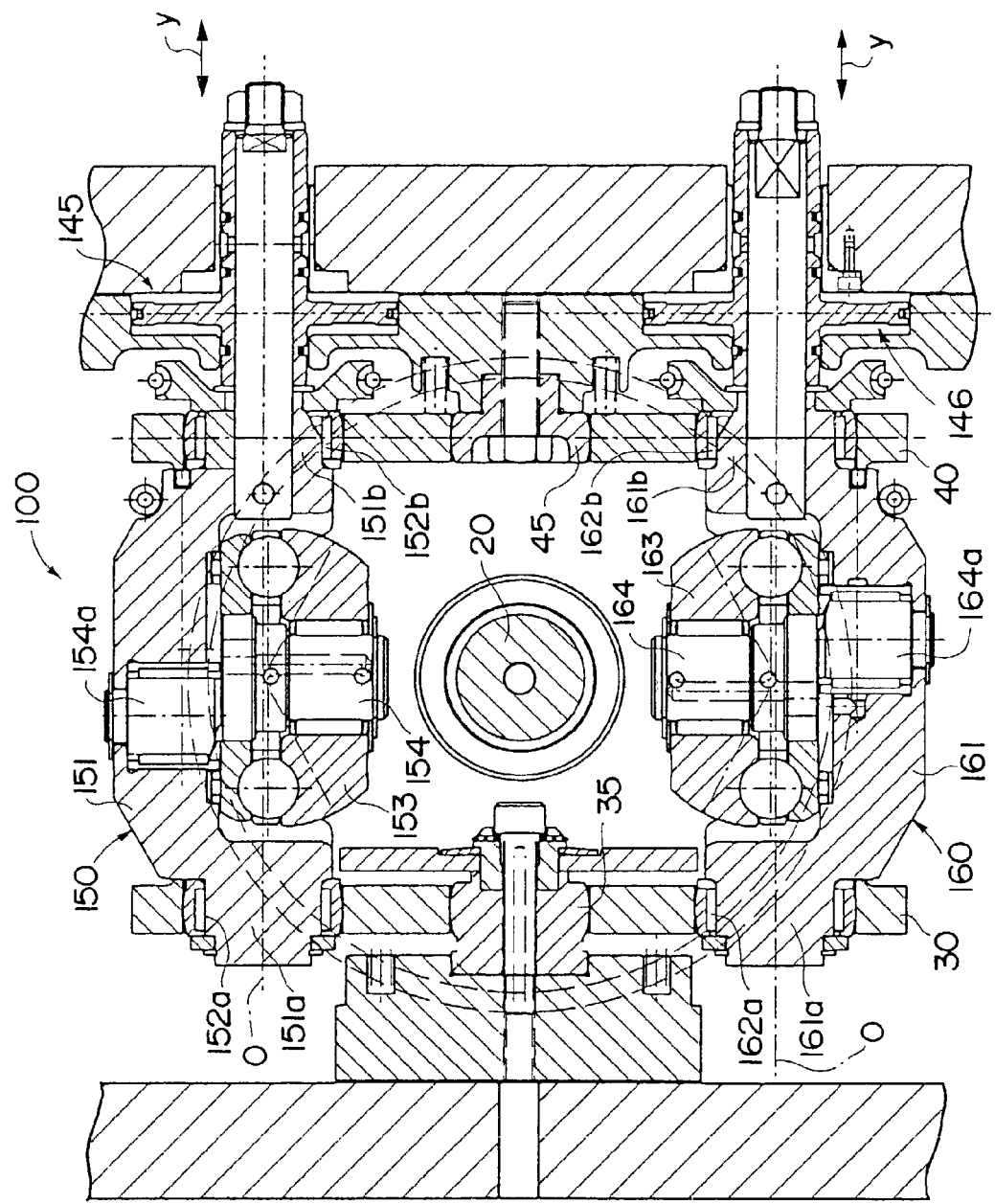
FIG. 3 is a sectional view of the abovementioned toroidal continuously variable transmission along the arrow line III—III in FIG. 1.

The speed reduction operation in the toroidal continuously variable transmission mechanism CVT constructed as described above is accomplished by causing the first through fourth trunnion assemblies 150, 160, 250 and 260 to perform a tilting swinging movement about respective tilting-swinging axes O (axes extending perpendicular to the plane of the page in FIG. 2). This structure will be described with reference to FIG. 3, which is a sectional view along the arrow line III—III in FIG. 1, using the case of the first toroidal transmission unit 100 as an example. Furthermore, since the second toroidal transmission unit 200 has basically the same construction, a description of this toroidal transmission unit will be omitted.

The first and second trunnion assemblies 150 and 160 that form parts of the first toroidal transmission unit 100 are disposed in symmetrical positions on either side of the rotational axis of the transmission input shaft 20 (which is also the rotational axis of the first input and first output disks 110, 120). The first and second trunnion assemblies 150 and 160 have trunnion members 151 and 161 that are supported by first and second tension members 30 and 40; these first and second tension members 30 and 40 are supported by spherical-surface bearings 34 and 45 so that these tension members are free to swing, so that the trunnion members 151 and 161 are both capable of a swinging movement in the left-right direction (y direction) in FIG. 3. The trunnion members 151 and 161 are supported by both tension members 30 and 40 via respective bearings 152a, 152b and 162a, 162b in left and right trunnion shaft parts 151a, 151b and 161a, 161b, so that these trunnion members are capable of performing a tilting swinging movement about the tilting-swinging axes O with respect to the first and second tension members 30 and 40.

Shaft members 154 and 164 which have axes that are perpendicular to the tilting-swinging axes O are attached to the trunnion members 151 and 161, and power rollers 153 and 163 are attached to these shaft members 154 and 164 so that these power rollers are free to rotate. Furthermore, the power rollers 153 and 163 are supported by the trunnion members 151 and 161 via bearings so that these power rollers are free to rotate; as a result, these power rollers 153 and 163 are pushed by the inside surfaces 110a and 120a of the input and output disks 110 and 120 so that these power rollers are held in a state in which the rollers are clamped in contact.

Here, the shaft members 154 and 164 have integral eccentric shafts parts 154a and 164a that are offset from the centers of rotation of the power rollers 153 and 163, and these eccentric shaft parts 154a and 164a are supported on the trunnion members 151 and 161 so that these shaft parts are free to rotate. As a result, automatic centering of the trunnion members 151 and 161 is possible, and automatic centering is performed so that the directions of the rotational speeds of the power rollers 153 and 163 and the input and output disks 110 and 120 at the contact points between the respective parts always coincide.

Meanwhile, when the trunnion members 151 and 161 are caused to move in the y direction, a difference is generated in the directions of the rotational speeds of the power rollers 153 and 163 and input and output disks 110 and 120 at the contact points between the respective parts, so that a force in the direction that causes the directions of the abovementioned rotational speeds to coincide is generated in the tilting swinging direction, and the trunnion members 151 and 161 are caused to perform a tilting swinging movement about the tilting-swinging axes O. As a result, the power rollers 153 and 163 can be caused to perform a tilting swinging movement along the inside surfaces 110a and 120a, i. e., a tilting swinging movement about the tilting-swinging axes O in the plane of FIG. 1, while remaining clamped between the input and output disks 110 and 120. Hydraulic actuators 145 and 146 are provided in order to apply a force which thus pushes the trunnion members 151 and 161 in the y direction.

Here, when the trunnion members 151 and 161 are pushed in the y direction by the hydraulic actuators 145 and 146 so that the power rollers 153 and 163 are caused to perform a tilting swinging movement along the inside surfaces 110a and 120a while remaining clamped between the input and output disks 110 and 120, the positions of the contact points between the power rollers 153 and 163 and the input disk 110 and the positions of the contact points between [the power rollers 153 and 163] and the output disk 120 vary. As a result, when the transmission input shaft 20 is rotationally driven so that the input disk 110 is rotationally driven, the rotational speed of the output disk 120 that is rotated via the power rollers 153 and 163 various continuously in accordance with the tilting swinging movement of the power rollers 153 and 163.

This operation is similar in the case of the second toroidal transmission unit 200; as is seen from this, continuously variable speed change control is accomplished by the control of the tilting swinging movement of the first through fourth trunnion assemblies 150, 160, 250 and 260 in the toroidal continuously variable transmission mechanism CVT. In this way, the rotation of the transmission input shaft 20 is subjected to a continuously variable speed change and transmitted to the output disks 120 and 220; the first and second output disk gears 121 and 221 that are formed on the outer circumferences of these output disks 120 and 220 engage with a first gear 71 that forms a part of the power transmitting mechanism TM, so that the rotational driving force that has been subjected to a speed change is transmitted to the power transmitting mechanism TM.

As is seen most clearly from FIG. 1, the power transmitting mechanism TM is constructed from first through seventh countershafts CS1 through CS7 that are disposed parallel to the transmission input shaft 20, first through ninth gears 71 through 79 that are disposed on these countershafts, an IVT clutch 65, a torque-splitting clutch 66, a direct clutch 87 and a speed-change planetary gear mechanism 80. The first and second gears 71 and 72 are fastened to the first countershaft CS1, and the first gear 71 engages with the first and second output gears 121 and 221 (see FIG. 2). The eighth gear (final speed-reduction driving gear) 78 is fastened to the second countershaft CS2; furthermore, [this second countershaft CS2] is connected to one end member of the direct clutch 87. Furthermore, a ring gear 84 that forms a part of the speed-change planetary gear mechanism 80 is disposed on one end member of the direct clutch 87.

The third countershaft CS3 is disposed on the second countershaft CS2 so that this third countershaft is CS3 is free to rotate relative to the second countershaft CS2. The third gear 73 which engages with the second gear 72, and a sun gear 81 which forms a part of the speed-change planetary gear mechanism 80, are disposed on the third countershaft CS3, and [this third countershaft CS3] is connected to the other end member of the direct clutch 87. In this direct clutch 87, the first end member and second end member are connected so that these members can be freely engaged and disengaged, and the engagement and disengagement of the second and third countershafts CS2 and CS3 are controlled by this direct clutch 87.

The fourth countershaft CS4 is disposed on the third countershaft CS3 so that this fourth countershaft CS4 is free to rotate relative to the third countershaft CS3. The fourth gear 74 and sixth gear 76 are fastened to the fourth countershaft CS4; furthermore a carrier 82 which forms a part of the speed-change planetary gear mechanism 80 is attached to the fourth countershaft CS4. Pinion gears 83 are held on this carrier 82 so that these pinion gears 83 are free to rotate; these pinion gears 83 engage with sun gear 81 and ring gear 84 as shown in the figures. Specifically, the speed-change planetary gear mechanism 80 is constructed from a single-pinion type planetary gear.

The seventh gear 77 which engages with the sixth gear 76 is fastened to the fifth countershaft CS5, and the sixth and seventh countershafts CCS6 and CS7 are disposed on this fifth countershaft CS5 side by side so that these sixth and seventh countershafts are respectively free to rotate. The fifth gear 75 which engages with the fourth gear 74 is fastened to the sixth countershaft CS6. A driven sprocket 63 which forms a part of the belt mechanism BM is fastened to the seventh countershaft CS7. Furthermore, an IVT clutch 65 and torque-splitting clutch 66 are provided; control of the engagement and disengagement of the sixth and seventh countershafts CS6 and CS7 is accomplished by means of the IVT clutch 65, and control of the engagement and disengagement of the fifth and seventh countershafts CS5 and CS7 is accomplished by means of the torque-splitting clutch 66.

The eighth gear 78 which is fastened to the second countershaft CS2 engages with the ninth gear (final speed-reduction driven gear) 79 that forms a part of the final speed-reduction mechanism FD. The rotation of the ninth gear 79 is transmitted to the left and right driving wheels (not shown in the figures) via left and right axle shafts 6a and 6b by a differential mechanism 5.

Meanwhile, a flange part 11 is formed on the end part of the drive shaft 10, and a driving sprocket 61 is formed on the outer circumference of this flange part 11. The belt mechanism BM is constructed by mounting a chain (or tooth-equipped belt) 62 on the driving sprocket 61 and driven sprocket 63. Accordingly, the rotation of the drive shaft 10 is transmitted to the seventh countershaft CS7 via the belt mechanism BM.

Figure 4:
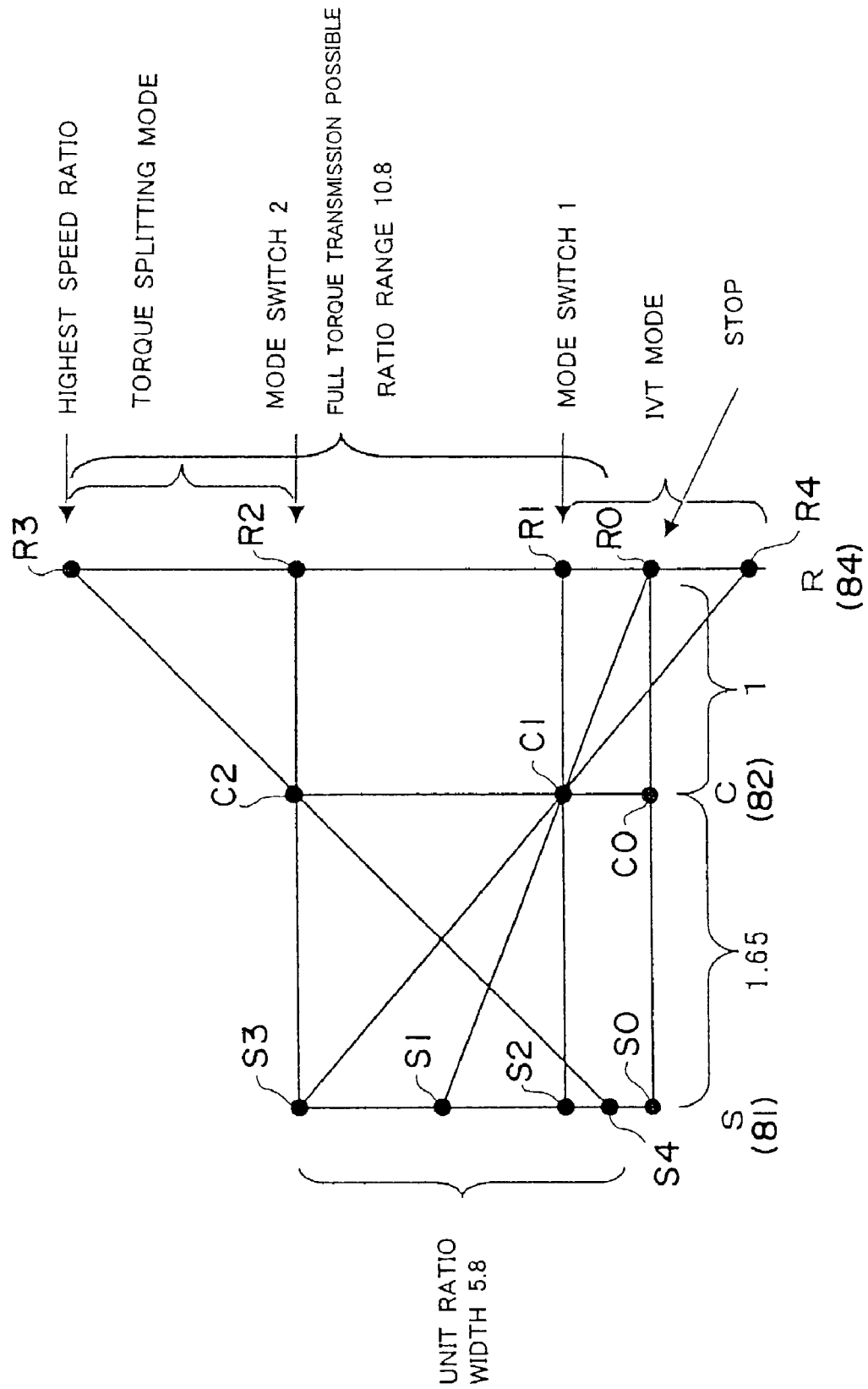
FIG. 4 is a velocity diagram which shows the speeds of the abovementioned toroidal continuously variable transmission.

The speed-change operation of the toroidal continuously variable transmission constructed as described above will be described with reference to the velocity diagram shown in FIG. 4. Furthermore, in this velocity diagram, the vertical lines indicated by S, C and R respectively indicate the rotational speeds of the sun gear 81, carrier 82 and ring gear 84. The points S0, C0 and R0 indicate the positions where the speed is zero. As is seen from the abovementioned structure, the output to the driving wheels is transmitted from the eighth gear 78, and this eighth gear 78 is connected to the ring gear 84 via the second countershaft CS2, so that the rotation of the ring gear 84 corresponds to the output rotational speed. Furthermore, when the shift lever installed at the driver's seat is set in the N or P range positions, the IVT clutch 65, torque-splitting clutch 66 and direct clutch 87 are all "off", so that the transmission of the power to the wheels is forcibly blocked.

Next, when the shift lever is set in the D range position from a state in which the vehicle is stopped, the IVT clutch 65 is first engaged, so that the carrier 82 is rotationally driven by the transmission of the rotation of the engine via the belt mechanism BM, IVT clutch 65, sixth countershaft CS6, fifth gear 75, fourth gear 74 and fourth countershaft CS4. At the same time, the sun gear 81 is also rotationally driven via the first gear 71, second gear 72, third gear 73 and third countershaft CS3 after the rotation of the engine is subjected to a speed change by the toroidal continuously variable transmission mechanism CVT. Since the speed reduction ratio of the belt mechanism BM is fixed, the rotation of the carrier 82 in this case is the rotation at point C2, which corresponds to the rotation of the engine. However, if the speed-change ratio of the toroidal continuously variable transmission mechanism CVT is set so that the rotation of the sun gear 81 is the rotation at point S1 in this case, then the rotation of the ring gear 84 is the rotation shown at point R0, i. e., a stopped state.

When the speed-change ratio of the toroidal continuously variable transmission mechanism CVT is varied from this state so that the rotation of the sun gear is reduced to the rotation shown at point S2, then speed-change control is performed which is such that the rotation of the ring gear 84 (output rotation) rises to point R1 while the rotation of the carrier 82 remains at point C1.

When a speed change is performed to this state, the IVT clutch 65 is disengaged, and the torque-splitting clutch 87 is engaged (mode switch 1). As a result, the transmission of the power via the belt mechanism BM ceases to be performed, and the sun gear 81 and ring gear 84 are directly coupled so that the speed-change planetary gear mechanism 80 as a whole rotates integrally. Specifically, a state results in which the sung gear 81, carrier 82 and ring gear 84 are caused to rotate integrally, so that when the speed-change ratio of the toroidal continuously variable transmission mechanism CVT is varies so that the rotation of the sun gear S1 is increased, the rotations of the carrier 82 and ring gear 84 are also increased along with this rotation of the sun gear. Thus, when a speed change is performed up to the limit of the possible range of the toroidal continuously variable transmission mechanism CVT so that the rotation if the sun gear 81 is increased to point S3, the rotations of the carrier 82 and ring gear 84 are also increased to point C2 and point R2.

Next, the direct clutch 87 is disengaged, and the torque-splitting clutch 66 is engaged. Consequently, a state results in which the rotation of the engine passes through the belt mechanism BM and is transmitted to the carrier 82 via the fifth countershaft CS5, seventh gear 77, sixth gear 76 and fourth countershaft CS4. The respective gear ratios and the like are set so that the rotation of the carrier 82 is the rotation indicated by point C2 in this state; when the speed-change ratio of the toroidal continuously variable transmission mechanism CVT is varied from this state so that the rotation of the sun gear S1 is reduced to point S4, the rotation of the ring gear 84 rises to point R3.

Thus, the rotation of the ring gear 84 connected to the output side can be subjected to a continuous speed change to points ranging from point R1 or point R2 to point R3 from a state of zero indicated by point R0. Furthermore, if the IVT clutch 65 is engaged and the speed-change ratio of the toroidal continuously variable transmission mechanism CVT is set so that the rotation of the carrier 82 is the rotation indicated by point C1 and the rotation of the sun gear 81 is the rotation indicated by point S1, thus causing the rotation of the sun gear to rise to point S3 from a state in which the ring gear 84 is stopped, the rotation of the ring gear 84 rises to point R4 in the opposite direction from that described above; as a result, continuous speed-change control is performed in the reverse direction.

The coupling mechanism CP that transmits the rotation of the drive shaft 10 to the transmission input shaft 20 in the toroidal continuously variable transmission constructed as described above will be described with reference to FIG. 5. This coupling mechanism CP is constructed from the flange part 11 of the drive shaft 10, the flange part 21 of the transmission input shaft 20, and a connecting plate 15 that is disposed between the two flange parts 11 and 21. This coupling mechanism CP constitutes an Oldham coupling mechanism.

Figure 6:
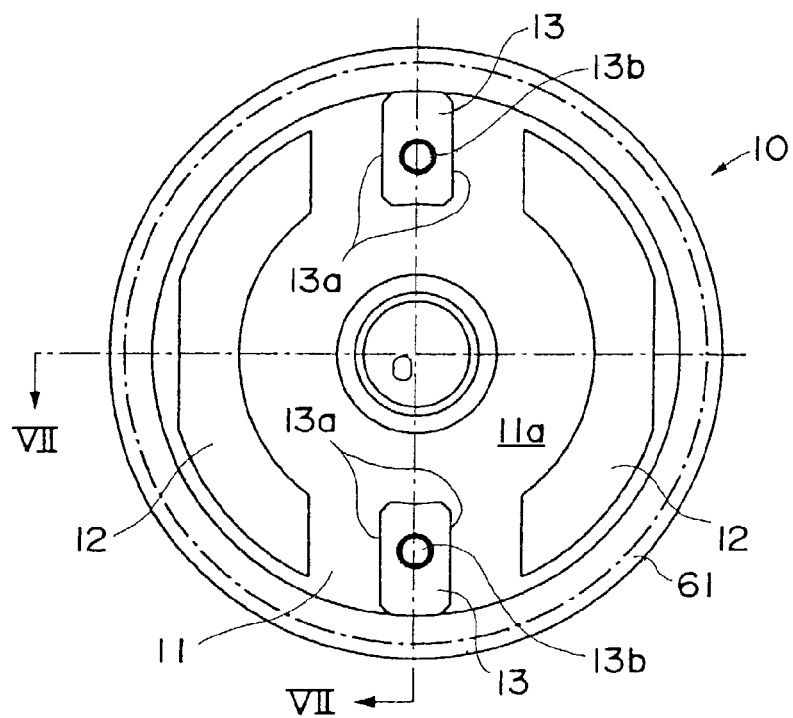
FIG. 6 is a side view which shows the drive shaft that forms a part of the abovementioned coupling mechanism.
Figure 7:
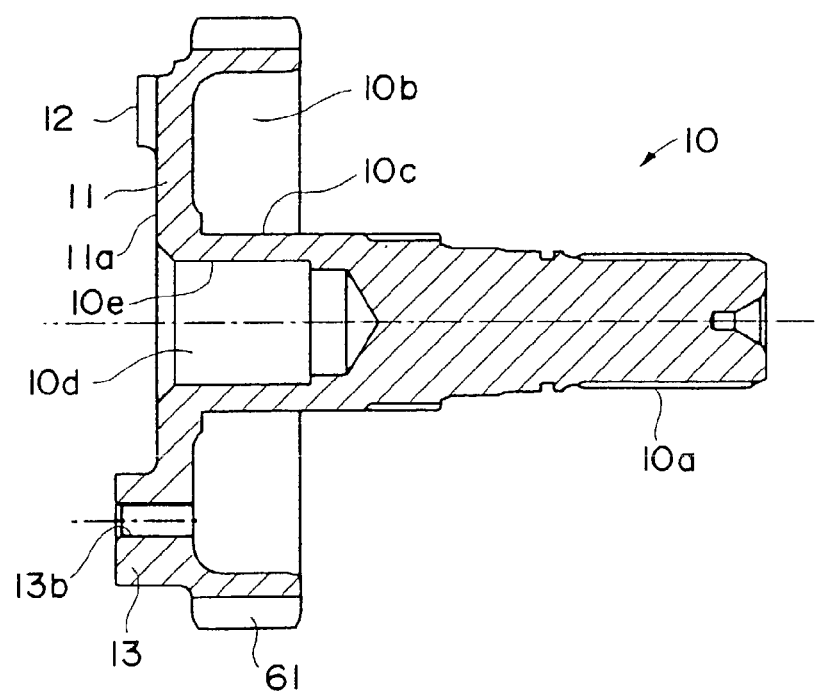
FIG. 7 is a sectional view of the drive shaft that forms a part of the abovementioned coupling mechanism.

The drive shaft 10 is shown in detail in FIGS. 6 and 7; connecting splines 10a used for connection with the mass damper MD are formed on the right end [of this drive shaft 10], and a disk-from flange part 11 is formed on the left end. A driving sprocket 61 that forms a part of the belt mechanism BM is formed on the outer circumference of the flange part 11. A pair of rectangular first connecting projections 13 that protrude to the left in the axial direction and extend in the diametrical direction are formed on the left end surface 11a of the flange part 11 in positions that are separated by 180 degrees with respect to the center of rotation. Screw holes 13b which are used to hold the connecting plate 15 are formed in the first connecting projections 13. The side surfaces 13a of these first connecting projections 13 that extend in the diametrical direction are parallel to each other and have a specified width. Furthermore, circular-arc-form supporting surfaces 12 that protrude slightly the to left are formed between the first connecting projections 13 on the left end surface 11a of the flange part 11.

A ring-form outer circumferential side recessed part 10b which is positioned on the inner circumferential side of the driving sprocket 61 is formed in the right side of the flange part 11 so that this recessed part 10b opens to the right, and an automatic-centering ball bearing 28 that supports the drive shaft 10 so that the drive shaft 10 is free to rotate relative to the housing HSG is attached by being fit over the outer circumferential surface 10c of the shaft sot that this ball bearing 28 is positioned inside the abovementioned outer circumferential side recessed part 10b. Furthermore, a cylindrical inner circumferential side recessed part 10d which opens at the left end surface is formed on the inner circumferential side of the abovementioned outer circumferential side recessed part 10b, and the tip end portion 25 of the input shaft 20 is inserted into the interior of this inner circumferential side recessed part 10d, and supported by a roller bearing 26 so that the input shaft 20 is free to rotate. In this case, the roller bearing 26 rotates while making sliding contact with the inner circumferential surface 10e of the inner circumferential side recessed part 10d.

Figure 8:
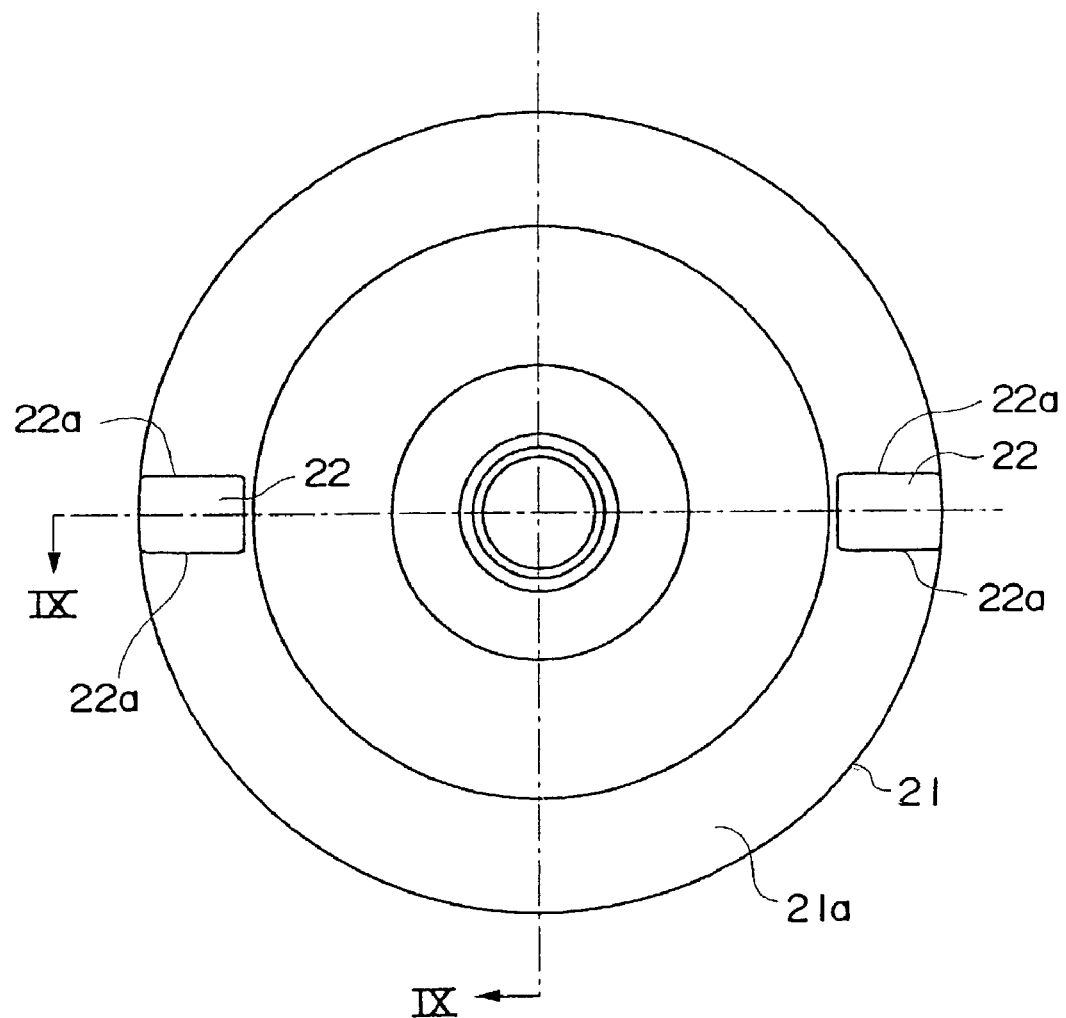
FIG. 8 is a side view of the transmission input shaft that forms a part of the abovementioned coupling mechanism.
Figure 9:
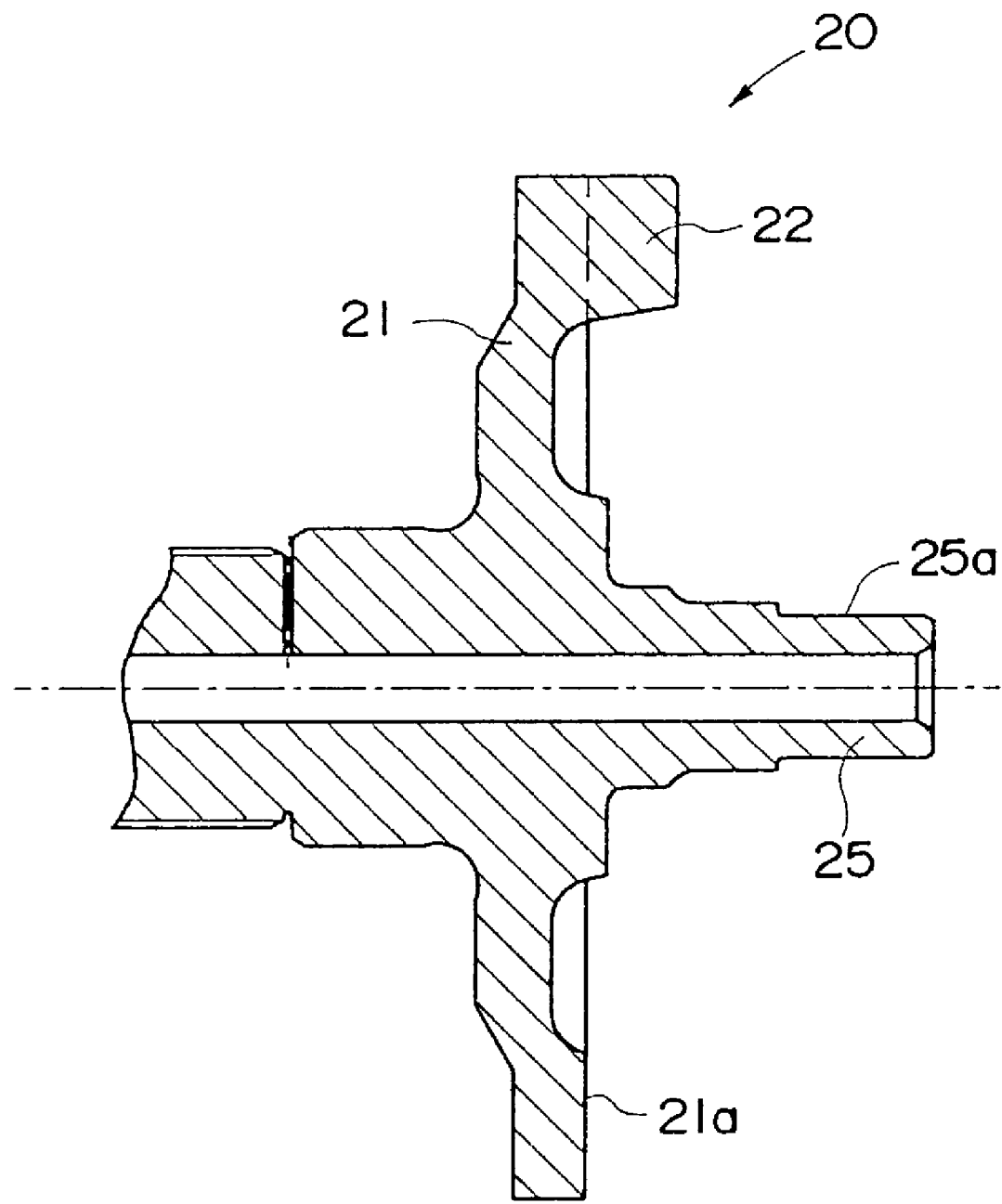
FIG. 9 is a sectional view of the transmission input shaft that forms a part of the abovementioned coupling mechanism.

The left end part of the transmission input shaft 20 is shown in FIGS. 8 and 9; a disk-form flange part 21 is formed as an integral part of the transmission input shaft 20, and a pair of rectangular second connecting projections 22 which protrude to the right in the axial direction and extend in the diametrical direction are formed on the right end surface 21a of this flange part 21 in positions that are separated by 180 degrees with respect to the center of rotation. The side surfaces 22a of these second connecting projections 22 that extend in the diametrical direction are parallel to each other and have a specified width.

Figure 10:
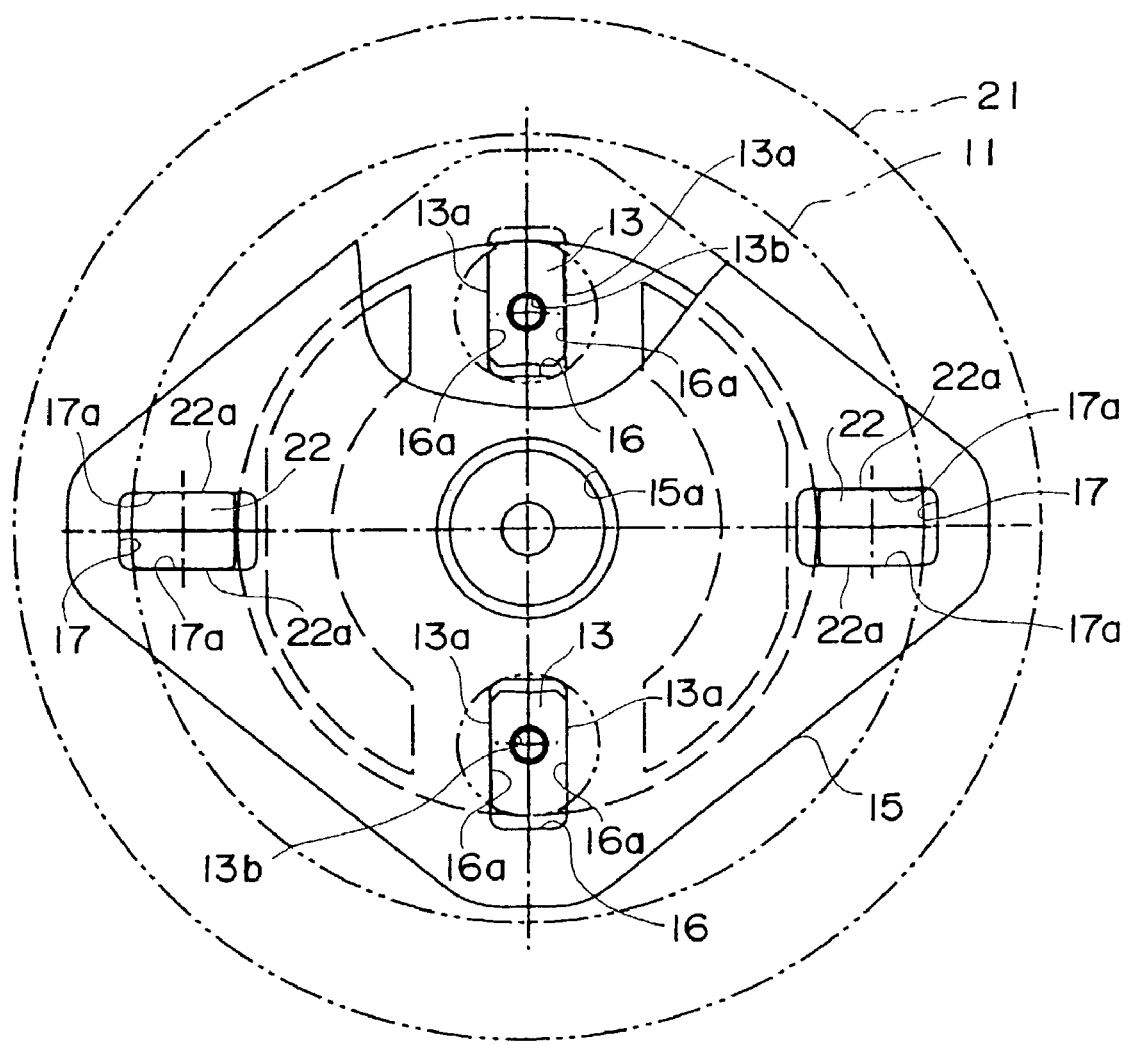
FIG. 10 is a side view of the abovementioned coupling mechanism.

As is shown in FIG. 10, the connecting plate 15 is formed as a diamond-shaped plate-form part, and a circular hole 15a through which the tip end portion 25 of the input shaft 20 is passed is formed in the central portion of this connecting plate 15. Furthermore, a pair of rectangular first connecting holes 16 which accommodate and hold the inserted first connecting projections 13 are formed in positions that are separated by 180 degrees with respect to the center of rotation, and a pair of rectangular second connecting holes 17 which accommodate and hold the inserted second connecting projections 22 are formed in positions that are separated by 180 degrees with respect to the center of rotation, and that have a rotational-position relationship which is such that these holes 17 are oriented perpendicular to the abovementioned first connecting holes 16.

Furthermore, the left and right side surfaces 16a of the first connecting holes 16 that extend in the diametrical direction are parallel to each other, and are set at a width that is slightly greater than the width of the left and right side surfaces 13a of the first connecting projections 13; moreover, the width [of these first connecting holes 16] in the diametrical direction is set at a dimension that is greater than the dimension of the first connecting projections 13 in the diametrical direction. Accordingly, when the first connecting projections 13 are inserted into the first connecting holes 16, relative movement in the circumferential direction (i. e., relative rotation) is constrained, but relative movement in the diametrical direction (sliding movement of the left and right side surfaces 13a and 16a) is allowed. Similarly, the left and right side surfaces 17a of the second connecting holes 17 that extend in the diametrical direction are parallel to each other, and are set at a width that is slightly greater than the width of the left and right side surfaces 22a of the second connecting projections 22; furthermore, the width [of these second connecting holes 17] in the diametrical direction is set at a dimension that is greater than the dimension of the second connecting projections 22 in the diametrical direction. Accordingly, when the second connecting projections 22 are inserted into the second connecting holes 17, relative movement in the circumferential direction (i. e., relative rotation) is constrained, but relative movement in the diametrical direction (sliding movement of the left and right side surfaces 22a and 17a) is allowed.

Figure 5:
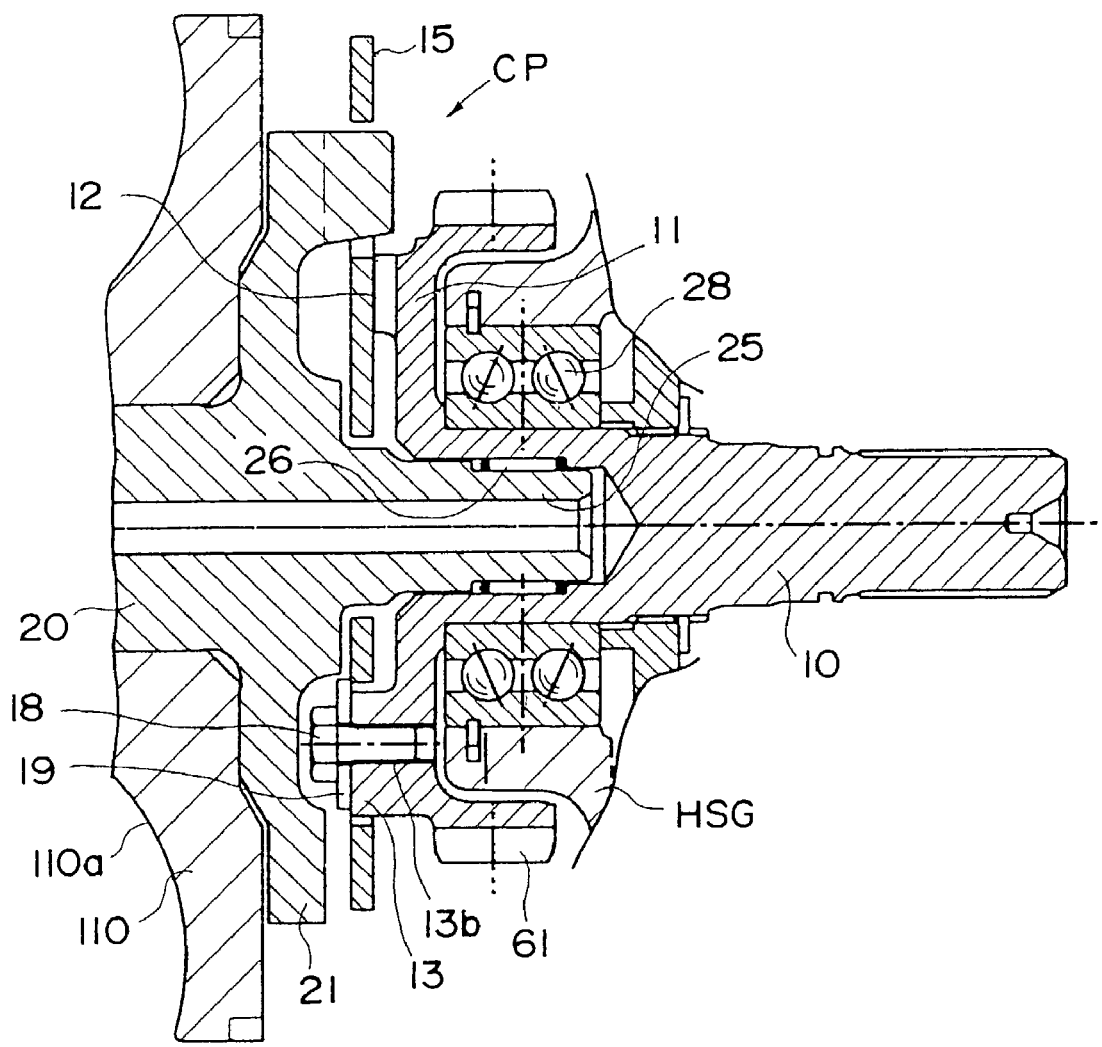
FIG. 5 is a sectional view which shows the coupling mechanism that forms a part of the abovementioned toroidal continuously variable transmission.

As is shown in FIG. 5, the connecting plate 15 is attached by screwing bolts 18 into the screw holes 13a and holding these [bolts] by means of washers 19 in a state in which [the connecting plate 15] contacts the supporting surfaces 12 disposed on the flange part 11 of the drive shaft 10, and the first connecting projections 13 are inserted into the first connecting holes 16. As a result, the connecting plate 15 is attached to the left end surface of the drive shaft 10; in this case, the connecting plate 15 is held loosely between the supporting surfaces 12 and the washers 19, so that movement in the direction perpendicular to the axis is possible relative to the drive shaft 10. However, in a state in which the first connecting projections 13 are inserted into the first connecting holes 16, as was described above, movement of the connecting plate 15 relative to the drive shaft 15 is possible only in the diametrical direction; movement in the direction of rotation is constrained.

The drive shaft 10 to which the connecting plate 15 has thus been attached is attached to the transmission housing HSG with this drive shaft 10 being supported by a ball bearing 28 disposed in the outer circumferential side recessed part 10b so that the drive shaft 10 is free to rotate. Furthermore, the tip end portion 25 of the transmission input shaft 20 is inserted into the interior of the inner circumferential side recessed part 10d, and is supported by a roller bearing 26 so that this tip end portion 25 is free to rotate. Here, the load that acts on the transmission input shaft 20 is received by the roller bearing 26 at the tip end portion 25 of the input shaft 20 that is inserted into the inner circumferential side recessed part 10d of the drive shaft 10; however, since the roller bearing 26 is disposed in the same position as the ball bearing 28 in the axial direction so that these parts overlap in the diametrical direction, the load of the tip end portion 25 of the input shaft 20 can be received by the housing HSG from the drive shaft 10 via the ball bearing 28, so that no biased load acts on the ball bearing 28 which supports the drive shaft 10 so that the drive shaft 10 is free to rotate. Accordingly, the rotational support of the drive shaft 10 by the ball bearing 28 is stable.

In this case, furthermore, the second connecting projections 22 are inserted into the second connecting holes 17, so that the connecting plate 15 can move relative to the transmission input shaft 20 only in the diametrical direction, with movement in the direction of rotation being constrained.

Here, the diametrical direction in which the connecting plate 15 can move relative to the drive shaft 10 as a result of the engagement between the first connecting projections 13 and first connecting holes 16 and the diametrical direction in which the connecting plate 15 can move relative to the transmission input shaft 20 as a result of the engagement between the second connecting projections 22 and second connecting holes 17 differ by 90 degrees, so that a so-called Oldham coupling mechanism is constructed. Accordingly, even in cases where there is axial deviation in the drive shaft 10 and transmission input shaft 20, smooth relative movement in the axial direction and transmission of rotation between the drive shaft 10 and transmission input shaft 20 are accomplished while the abovementioned axial deviation is absorbed by the abovementioned relative movement in two diametrical directions that differ by 90 degrees.

Furthermore, as is seen most clearly from FIG. 5, the driving sprocket 61 and ball bearing 28 are disposed in more or less the same position in the axial direction so that these parts overlap in the diametrical direction. Accordingly, the force that acts on the driving sprocket 61 when the power is transmitted via the belt mechanism BM is received directly by the ball bearing 28, and the biased load that is applied to the ball bearing 28 is small, so that the drive shaft 10 can be stably supported in a manner that allows free rotation. Furthermore, the roller bearing 26 that supports the tip end portion 25 of the transmission input shaft 20 so that this shaft is free to rotate inside the inner circumferential side recessed part 10*d* of the drive shaft 10 is disposed in more or less the same position as the ball bearing 28 in the axial direction, so that these parts overlap in the diametrical direction. Accordingly, no biased load acts on the roller bearing 26, and the tip end portion 25 of the transmission input shaft 20 can be stably supported so that this shaft is free to rotate. Furthermore, since the roller bearing acts mainly as a supporting part, a supporting member such as a bush may also be used.

In the present invention, as was described above, the drive shaft which is rotationally driven by a driving source, and the input shaft on which an input disk, output disk, trunnion assembly and pushing mechanism are disposed, are connected by a rotary connecting mechanism that is constructed using an Oldham coupling. Accordingly, smooth relative movement in the axial direction and transmission of rotation can be accomplished between the drive shaft and input shaft while allowing relative movement in the axial direction and axial deviation between the two shafts; furthermore, since the action of a biased load on the coupling part can also be prevented, the movement of the input disk in the axial direction is smooth.

In this case, it is desirable that the Oldham coupling that constitutes the abovementioned rotary connecting mechanism be constructed from a pair of first connecting projections which are separated by 180 degrees about the rotational axis and caused to protrude in the axial direction on the end surface of the drive shaft, and which are formed with a rectangular shape that extends in the diametrical direction, a pair of second connecting projections which are separated by 180 degrees about the rotational axis and caused to protrude in the axial direction on the end surface of the input shaft that faces the end surface of the drive shaft, and which are formed with a rectangular shape that extends in the diametrical direction, and a connecting member which is disposed between the end surface of the drive shaft and the end surface of the input shaft, and in which a pair of first connecting holes that accommodate the first connecting projections so that these projections are free to slide in the diametrical direction and constrained in the circumferential direction, and a pair of second connecting holes that accommodate the second connecting projections so that these projections are free to slide in the diametrical direction and constrained in the circumferential direction, are formed, and that the first connecting holes and second connecting holes be formed in positions that are separated by 90 degrees about the rotational axis. As a result of using an Oldham coupling that is constructed in this manner, the sliding movement of the first connecting projections in the diametrical direction that is allowed by the engagement of the first connecting projections with the first connecting holes, and the sliding movement of the second connecting projections in the diametrical direction that is allowed by the engagement of the second connecting projections with the second connecting projections with the second connecting holes, are separated by a rotational angle of 90 degrees; accordingly, axial deviation in any direction can be absorbed by these two sliding movements in the diametrical direction, so that a smooth transmission of rotation is accomplished between the two shafts. Furthermore, by disposing the first and second connecting projections and first and second connecting holes on the outside in the diametrical direction, it is possible to suppress the contact surface pressure between the first and second connecting projections and the first and second connecting holes to a small value even in cases where a large torque is transmitted, so that a large torque can be rotationally moved in the axis direction smoothly and without hindrance, thus allowing smooth transmission of the power.

Furthermore, it is desirable that a bearing that supports the drive shaft on the housing so that the drive shaft is free to rotate be provided, that an inner circumferential side recessed part be formed in the central portion of the drive shaft so that this recessed part opens on the side of the input shaft, that the tip end portion of the input shaft on the side of the drive shaft be formed so that this tip end portion can be inserted into the inner circumferential side recessed part, that a supporting member be provided which is disposed between the abovementioned tip end portion and the inner circumferential side recessed part, and that the bearing and supporting member be disposed in substantially the same position in the axial direction so that these parts overlap in the diametrical direction. As a result, when the load that acts on the input shaft is received by the supporting member at the tip end portion of the input shaft that is inserted into the inner circumferential side recessed part, the supporting member is disposed in the same position as the bearing in the axial direction so that these parts overlap in the diametrical direction; accordingly, the load of the tip end portion of the input shaft can be received from the drive shaft by the housing via the bearing, so that no biased load acts on the bearing that supports the drive shaft so that the drive shaft is free to rotate. Consequently, the rotational support of the drive shaft by the bearing is stable.

The abovementioned toroidal continuously variable transmission may also be equipped with a wound power transmitting mechanism that transmits the rotation of the drive shaft to the countershafts, and a power transmitting mechanism that congregates the rotation of the output disk and the rotation of the countershafts, and transmits this congregated rotation to the output side (specifically, the toroidal continuously variable transmission may be constructed as a torque-splitting type toroidal continuously variable transmission as shown in the embodiment). In this case, it is desirable that the bearing that supports the drive shaft on the housing so that the drive shaft is free to rotate be disposed in substantially the same position in the axial direction as the driving rotating member that forms a part of the wound power transmitting mechanism disposed on the outer circumference of the drive shaft so that these parts overlap in the diametrical direction. As a result, the diametrical load that acts on the drive shaft when the power is transmitted by the wound power transmitting mechanism can act directly on the bearing, so that no biased load acts on the bearing, and the rotational support of the drive shaft by the bearing is stable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-359890 filed on Nov. 26, 2001 which is incorporated herein by reference.

What is claimed is:

1. A toroidal continuously variable transmission comprising:
    a drive shaft which is rotationally driven by a driving source;
    an input shaft which is disposed adjacent to and coaxially with said drive shaft;
    an input disk which rotates integrally with said input shaft;
    an output disk which is disposed coaxially with said input disk so as to be capable of rotating relatively to and so as to face the input disk;
    a trunnion assembly which is clamped between said input disk and said output disk so that this trunnion assembly is free to swing;
    a pushing mechanism which pushes said input disk and said output disk in the respective directions that cause these disks to clamp said trunnion assembly; and
    a rotary connecting mechanism which connects said drive shaft and said input shaft by means of an Oldham coupling;
    wherein said input disk has a half-doughnut-shaped input-side inside surface with a semicircular cross section, and
    wherein said output disk has a half-doughnut-shaped output-side inside surface that faces said input-side inside surface in the axial direction, and that has a semicircular cross section, said trunnion assembly is disposed inside a cavity surrounded by said input-side inside surface and said output-side inside surface, and is clamped in a state in which said trunnion assembly contacts said input-side and output-side inside surfaces, and said input disk and said output disk are disposed on said input shaft so that said disks face each other in positions that are coaxial with said input shaft;
    further comprising a bearing that supports said drive shaft on the housing rotatably;
    wherein an inner circumferential side recessed part is formed in the central portion of said drive shaft so that this recessed part opens on the side of said input shaft, the tip end portion of said input shaft on the said of said drive shaft is formed so that this tip end portion is inserted into said inner circumferential side recessed part, and a supporting member is provided which is disposed between said tip end portion and said inner circumferential side recessed part and which supports said tip end portion of said input shaft on said drive shaft; and
    wherein said bearing and said supporting member are disposed in substantially the same position in the axial direction so that these parts overlap in the diametrical direction.

2. The toroidal continuously variable transmission according to claim 1, wherein said input disk is spline-connected to said input shaft so that said input disk rotates integrally with said input shaft, said output disk is disposed on said input shaft so as to be capable of rotating relatively thereto, and an output disk gear that is used to lead out the output is formed on the outer circumference of said output disk.

3. The toroidal continuously variable transmission according to claim 1, wherein said supporting member is a roller bearing.

4. The toroidal continuously variable transmission according to claim 1, wherein the Oldham coupling that constitutes said rotary connecting mechanism comprises:
    a pair of first connecting projections which are separated by 180 degrees about the rotational axis, protruding in the axial direction on the end surface of said drive shaft, and which are formed in a rectangular shape that extends in the diametrical direction;
    a pair of second connecting projections which are separated by 180 degrees about the rotational axis, protruding in the axial direction on the end surface of said input shaft that faces the end surface of said drive shaft, and which are formed in a rectangular shape that extends in the diametrical direction; and
    a connecting member which is disposed between the end surface of said drive shaft and the end surface of said input shaft, and which is formed with a pair of first connecting holes that accommodate said first connecting projections so that these projections are slidable in the diametrical direction and constrained in the circumferential direction, and with a pair of second connecting holes that accommodate said second connecting projections so that these projections are slidable in the diametrical direction and constrained in the circumferential direction;
    said first connecting holes and second connecting holes being formed in said connecting member in positions that are separated by 90 degrees about the rotational axis.

5. The toroidal continuously variable transmission according to claim 4, wherein
    said first and second connecting projections are respectively formed from rectangular projections which are parallel and have a specified width, and which have left and right side surfaces that extend in the diametrical direction;
    said first and second connecting holes are formed from rectangular openings which are parallel and have a width that is slightly larger than said specified width, and which have left and right side surfaces that extend in the diametrical direction; and
    said first and second connecting projections are inserted into said corresponding first and second connecting holes, so that said drive shaft and said input shaft are connected via said connecting member.

6. The toroidal continuously variable transmission according to claim 1, comprising:
    a countershaft;
    a wound power transmitting mechanism that transmits the rotation of said drive shaft to said countershafts; and
    a power transmitting mechanism that congregates the rotation of said output disk and the rotation of said countershafts and transmits this congregated rotation to the output side;
    wherein a bearing that supports said drive shaft rotatably on the housing, and a driving rotating member that is disposed on the outer circumference of said drive shaft and that constitutes said wound power transmitting mechanism, are disposed in substantially the same position in the axial direction so as to overlap each other in the diametrical direction.

7. The toroidal continuously variable transmission according to claim 6, wherein said wound power transmitting mechanism comprises a belt type power transmitting mechanism, and said driving rotating member comprises a driving sprocket that is formed so that this driving sprocket is integrally connected to said drive shaft.

* * * * *